Nov. 28, 1967  K. WALLENTOWITZ  3,355,632
ELECTRONIC TIMER CIRCUIT
Filed Oct. 21, 1964  2 Sheets-Sheet 1
FIG. 1
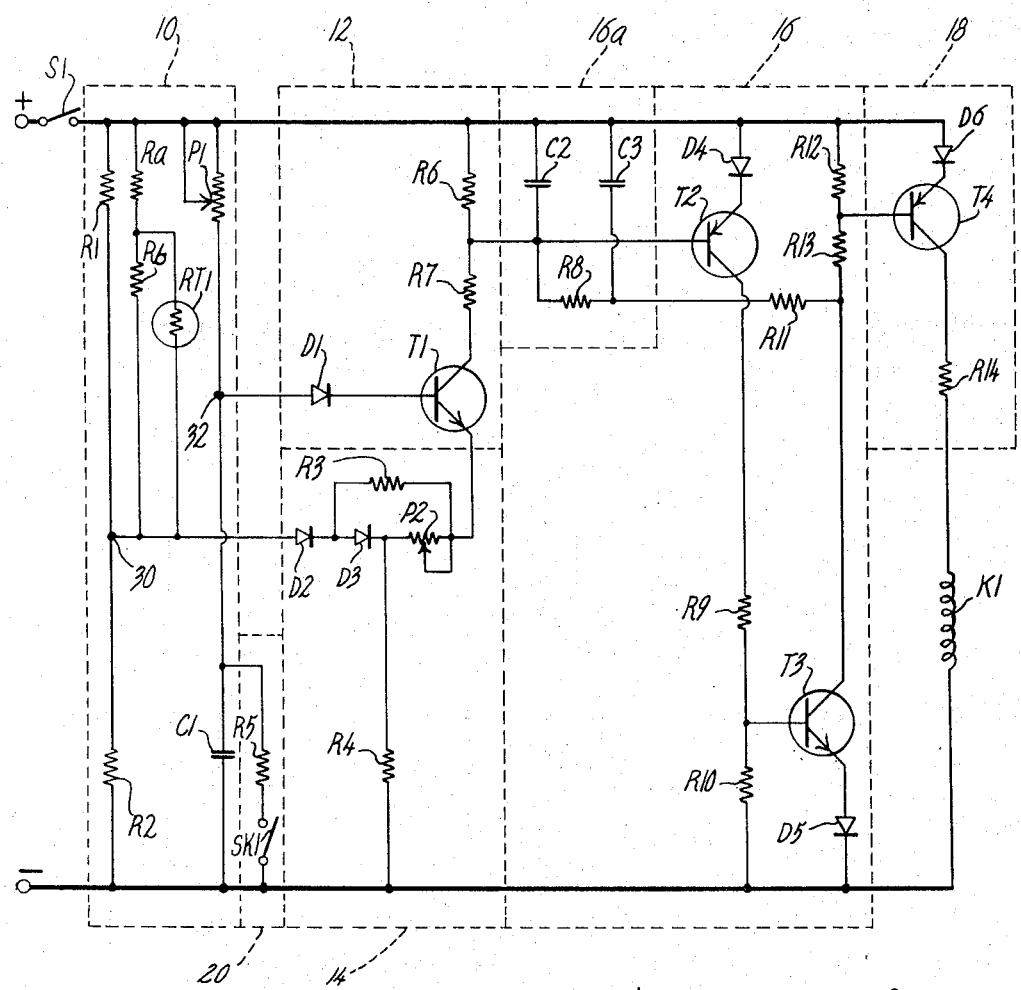
FIG. 1a
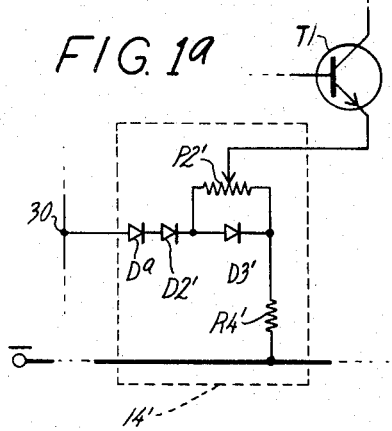
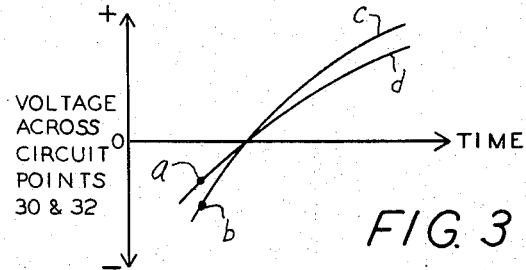
FIG. 3
INVENTOR.
KLAUS WALLENTOWITZ
BY Louis Altman
ATTORNEY 3,355,632
ELECTRONIC TIMER CIRCUIT
Klaus Wallentowitz, Torrington, Conn., assignor to General Time Corporation, New York, N.Y., a corporation of Delaware
Filed Oct. 21, 1964, Ser. No. 405,503
18 Claims. (Cl. 317—142)

ABSTRACT OF THE DISCLOSURE

An electronic timer circuit using a bridge energized from a single supply voltage source so that the time required to reach balance is independent of the absolute value of the source voltage. A transistor null detector circuit detects bridge unbalance, and has diodes for balancing out the inherent transistor junction voltages. The bridge is decoupled by a diode from the null detector. A transistor latching circuit is turned on when the bridge balance condition is detected.

---

This invention relates generally to timing, and in particular an an electronic circuit having utility as a delay or interval timer, or as an on-off cycle timer.

There are many varieties of timers on the market, and some of these are of the electronic type. Such timers generally derive their time base from an RC network involving the charging or discharging of a capacitor through a resistance. While this RC timing circuit approach is widely used and has many advantages, it is also subject to the disadvantage of inaccuracy. In particular, such timers fail to repeat the timing interval within one or two percent under conditions of varying supply voltage or, if semiconductors are employed, under conditions of varying temperature as well.

Accordingly, it is an object of this invention to provide an RC timing circuit which is repeatable with considerable accuracy despite variations in supply voltage. An additional object is to provide a semi-conductor circuit of this type which is also accurate in spite of temperature variations. Still another object is to accomplish this by means of relatively inexpensive components so as to provide a timer which is practical and economical as well as accurate.

In accordance with this invention, these objectives may be achieved by providing a bridge circuit which reaches a condition of balance after a period of time independent of the absolute value of source voltage. One side of the bridge derives a reference voltage which is not a pre-determined quantity, but is rather a pre-determined fraction of the source voltage. The other side of the bridge is a capacitive charging circuit which charges within a pre-determined time, not to a pre-determined quantity, but again to a voltage which is a pre-determined fraction of the source voltage. Accordingly, the time which it takes the capacitor to charge to a condition of equality (or any other relationship) relative to the reference voltage, is independent of the absolute value of the source voltage.

In a particular embodiment of the invention a novel transistorized null detector circuit is employed to detect the moment of bridge balance. This circuit includes novel means for balancing out the inherent junction voltages of semiconductor devices so as to avoid any errors in the detection of a zero-voltage condition. The null detector is equipped with semiconductor means to decouple the bridge from the sensing stage and thus prevent any effect on the length of the timing cycle. The inherent junction voltages of the semiconductor decoupling means are also prevented from interfering with accurate zero detection.

Still another feature of the invention is a novel avalanche transistor latching circuit or bistable device which switches on when the null condition is detected and remains on thereafter.

Also disclosed herein is a novel on-off cycle timer in which separate null detectors and separate bridge arms cooperate with bistable switching circuitry of the type described above, to cycle back and forth between on and off conditions.

The foregoing brief summary of the invention will now be supplemented by a detailed description, in conjunction with the following drawings:

FIG. 1 is a schematic circuit diagram of a delay timer in accordance with this invention.

FIG. 1a shows an alternative compensating network for use with the circuit of FIG. 1.

FIG. 3 is a graph illustraitng operation of a slightly over-compensated network.

Figure 2:
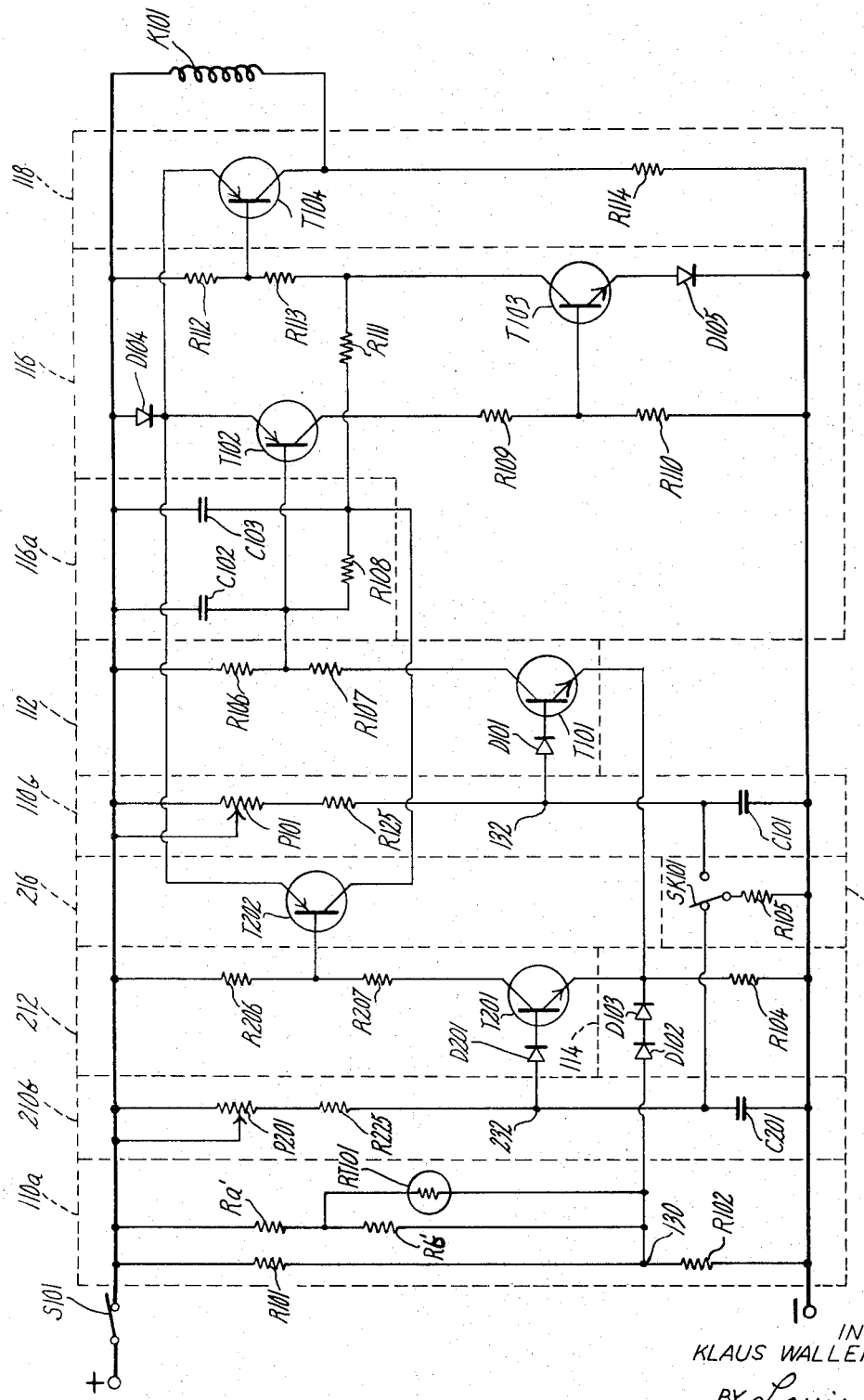
FIG. 2 is a schematic circuit diagram of an on-off cycle timer in accordance with this invention.

In FIG. 1 the reference numeral 10 generally designates a bridge type balancing circuit. Circuit 12 is a transistor null detector which determines when the bridge 10 has reached a condition of balance. Circuit 14 is a compensating network which allows accurate null detection by circuit 12 in spite of the inherent junction potentials of semiconductor devices. Circuit 16 is a two stage transistor bistable circuit which is triggered by the detector 12 and latches into conduction by means of a feedback network 16a. Circuit 18 is a final power amplifier output stage which responds to the latch circuit 16 and energizes an output relay K1. Circuit 20 responds to energization of the relay K1 by de-energizing the timing capacitor of this circuit and thus restoring the timer to its initial condition for the start of the next timing cycle.

One side of the bridge circuit 10 includes a pair of resistors R1 and R2 connected in series across the positive and negative power busses. If the loading effects of circuits 12 and 14 on the bridge 10 are ignored for the moment, this connection results in a voltage divider action such that the voltage at circuit point 30 is always a pre-determined fraction of the total supply voltage, regardless of what the absolute magnitude of the supply voltage may be or how it may vary. For example, if the resistances of R1 and R2 are equal, then the voltage at point 30 will be one-half of the supply voltage.

The other half of the bridge circuit 10 includes a capacitor C1 which is in series with the potentiometer P1 across the same source voltage supply busses. The charging time of capacitor C1 may be varied by adjusting potentiometer P1. It will now be assumed that at the start of operation the timing capacitor C1 is completely discharged. Under such conditions, when the on-off switch S1 is initially closed, the timing capacitor C1 begins to charge and the voltage across the capacitor therefore builds up from zero. The time which it takes the capacitor C1 to charge to a given fraction of the supply voltage is dependent only upon its RC time constant, and not upon the absolute value of the supply voltage. More specifically, if the voltage at point 30 is equal to one-half the supply voltage, then, whatever the absolute value of the supply voltage may be, a pre-determined time is required for the voltage at point 32 to build up to one-half the supply voltage and thus reach a condition of equality with the voltage at point 30. This pre-determined time is not a function of the absolute value of the supply voltage. Therefore, the time which elapses from the closing of switch S1 to the equalizing of the voltages at points 30 and 32 is a constant time interval unaffected by any variation in the supply voltage. This provides a voltage-insensitive time base.

In order to make the bridge circuit 10 immune to temperature changes, it is necessary to employ certain additional components. The resistance of the timing potentiometer P1 and resistors R1 and R2, as well as the capacitance and leakage current of the timing capacitor C1, are all quantities which vary with temperature. The variations in R1 and R2 cancel each other out, but the variations in P1 and C1 affect the timing accuracy unless they are compensated for by a network including resistors $Ra$ and $Rb$ connected in series across bridge resistor R1, and a thermistor RT1 connected across the resistor $Rb$. The choice of component values is dictated by the equation:

$$T = \frac{R_{P1}R_{C1}}{R_{P1}+R_{C1}} C_1 \ln \frac{1}{1 - \frac{R_2(1+R_{P1/R_{C1}})}{R_2+R_{1ABT}}}$$

In this equation T is the measured time interval, $R_{P1}$ and $R_2$ are the resistances of components P1 and P2 respectively, $R_{C1}$ is the leakage resistance of capacitor C1, $C_1$ is the capacitance of capacitor C1, and $R_{1ABT}$ is the resistance of R1 in parallel with the network comprising $Ra$ in series with the parallel combination of $Rb$ and RT1.

Analysis shows that $R_{1ABT}$ equals:

$$\frac{R_1(R_A + R_B R_T/(R_B+R_T))}{R_1 + R_A + R_B R_T/(R_B+R_T)}$$

where $R_1$, $R_A$, $R_B$, and $R_T$ are the resistances of components R1, $Ra$, $Rb$, and RT1 respectively.

Circuit 12 detects equality between the voltages at circuit points 30 and 32. The circuit includes a sensing transistor T1 the collector of which is connected to the positive bus through the series load resistances R6 and R7. The base of transistor T1 is connected through a blocking diode D1 to sense the rising capacitive charging voltage at circuit point 32. The emitter of transistor T1 is connected through a compensating network 14 to circuit point 30. Speaking in general terms, when the capacitive charging voltage at point 32 goes above the fixed reference voltage at point 30, the transistor T1 is turned on, thus detecting the end of the time interval measured by the circuit 10. The turning on of transistor T1 then actuates the bistable latching circuit 16 which in turn causes the output amplifier 18 to operate the relay K1. Stage T1 also serves to amplify the small signal appearing across circuit points 30 and 32 immediately after zero-crossing.

The diode D1 prevents the base of the transistor T1 from supplying $I_{CBO}$ leakage current to the bridge circuit 10 during the time-measuring interval when the voltage at point 32 is lower than the reference voltage at point 30. If such current were to flow during this interval, the rate of charging of capacior C1 would be altered and consequently the timing accuracy would be affected. However, when the time-measuring interval is concluded and the capacitive charging voltage at point 32 goes above the reference voltage at point 30, then diode D1 allows signal current to be conducted to the base of transistor T1.

Those skilled in the electronic arts will readily appreciate the advantages of using a transistorized detector such as the circuit 12 in this application; for example, low power consumption, lower temperature, and small size. However the use of the transistor T1 also causes some complications, which it is one of the purposes of this invention to avoid. The time interval which is measured with great accuracy by the bridge circuit 10 is concluded at the instant that the rising voltage at point 32 equals the fixed reference voltage at point 30. Therefore transistor T1 must detect a condition of exact voltage equality. However in using any semiconductor junction device to detect voltage equality, the problem of the inherent junction potential is encountered. As the potential difference between points 30 and 32 approaches zero, the transistor T1 remains in the cut-off condition even beyond zero potential difference until the inherent junction potential of the base-emitter junction is overcome. The same effect is exhibited by the semiconductor diode D1, which will not conduct until its inherent junction potential is overcome. This would result in conduction commencing when point 32 has become slightly higher than point 30, instead of at the moment of exact equality. Specifically, the amount by which point 32 must be higher than point 30 is equal to inherent junction potential of the base-emitter junction of the transistor T1 plus the inherent junction potential of the diode D1.

In order to restore accurate zero-detecting conditions, it is necessary to employ the network 14 to compensate for the junction potentials of diode D1 and transistor T1 which would otherwise prevent the detector circuit 12 from fully utilizing the accuracy of the bridge circuit 10. Unlike the reference potential established at point 30 and the charging time of the capacitor C1, the junction potentials of transistor T1 and diode D1 do not remain proportional to the supply voltage as its value changes. Therefore, the addition of a non-proportional voltage equal to the combined junction potential of the transistor and the diode introduces a non-proportional quantity into the time interval required for the voltages to equalize. For any one value of the supply voltage, such quantity could be compensated for by adjusting the potentiometer P1, but this adjustment would not be valied for different values as the supply voltage varied. Moreover, even for conditions of constant supply voltage, the junction potentials would vary in the well known manner with changes in ambient temperature, thus varying the effect of these potentials on the length of the timing interval.

In accordance with this invention the junction potentials of transistor T1 and diode D1 are balanced out by the junction potentials of a pair of diodes D2 and D3. If one considers the circuit loop proceeding from circuit point 30 through diodes D2 and D3, the emitter-base junction of transistor T1, and the blocking diode D1 to circuit point 32, it will be seen that the junction potentials of diodes D2 and D3 are opposite to the junction potentials of transistor T1 and diode D1 about this loop, thus tending to cancel out these undesired potentials. The two compensating diodes D2 and D3 can be selected so that their combined junction potentials are roughly equal and opposite to the combined potentials of the diode D1 and the base-emitter junction of the transistor T1.

But for more exact compensation and hence greater timing accuracy over varying voltage conditions, the compensating diodes D2 and D3 are selected to slightly overbalance the junction potentials of transistor T1 and diode D1, and an adjustment network comprising resistor R3 and potentiometer P2 is employed to lower the opposing voltage to the point of exact compensation. Potentiometer P2 and resistor R3 form a voltage divider to enable selection of some portion of the forward voltage drop across diode D3. This also provides adjustment to compensate for production variations in the junction potentials of T1, D1, D2, and D3 so that compensation can be achieved for each individual timer. Currents in the compensating network cause voltage drops across resistor R3 and the left-hand end of potentiometer P2. When the Kirchhoff equations for the loop comprising R3, D3, and P2 are written and solved, it is discovered that $V_{R3}$ is aqual to $V_{D3}R_3/(R_3+R_{P2})$. Therefore, when potentiometer P2 is adjusted so that the total voltage from circuit point 30 to the emitter of T1, $$V_{D2} + V_{D3}R_3/(R_3+R_{P2})$$

is exacly equal to the sum of the junction potentials of transistor T1 and diode D1, then the detecting circuit is zero compensated so as to detect a condition of exact equality between the voltages at circuit points 30 and 32.

Of course, it will be appreciated by those familiar with semiconductor devices that such compensation is exact only at the particular ambient temperature for which the potentiometer P2 was set. Subsequent temperature variations will cause changes in the junction potentials of the transistor T1, the blocking diode D1, and the compensating diodes D2 and D3. However, the network 14 of this invention is to a large extent inherently self-compensating for temperature. This is because the junctions of the diodes D2 and D3 are a fairly good copy of the junction of the diode D1 and base-emitter junction of the transistor T1, both as to junction potential and as to temperature coefficient. Therefore, the temperature variation of these two pairs of junctions will stay approximately in track over a fairly wide range. Thus, as the undesired junction potentials of diode D1 and transistor T1 increase or decrease, the approximately equal and opposite junction potentials of the compensating diodes D2 and D3 will also increase or decrease to very nearly the same extent, and balance will be maintained fairly well at least over the range of temperatures in which a timing device of this type would normally be employed.

An alternative configuration of the compensating network, designated 14′, is shown in FIG. 1a.

Thus, the timer of this invention is compensated both for supply voltage variations and for ambient temperature variations in such a way as to give excellent timing accuracy. Indeed, units of this type have been constructed very inexpensively, yet have operated with excellent accuracy of one percent over voltage and temperature changes. This is considered excellent performance for inexpensive electronic timing equipment.

It should be noted, however, that the compensating circuits 14 and 14′ do have a measure of voltage sensitivity, since the IR drops on which the operation depends will vary slightly when the current through the compensating circuit changes in response to normal source voltage variations. This will cause some timing error, although in most cases it will be acceptably small. Moreover, if the diode compensating network is adjusted to slightly overcompensate the junction voltages, so that the point of detection is slightly below zero voltage, then very nearly absolute timing consistency can be obtained. This is explained by FIG. 3 which shows that on curves $c$ and $d$ representing operation at different source voltages, the two over-compensated triggering points $a$ and $b$ tend to be one above the other, i.e. at the same place relative to the horizontal time axis. If this technique is used, it must be remembered that any mention herein of exact zero detection should be understood with the qualification that the point of detection is actually and intentionally placed slightly below zero.

As the capacitive charging voltage at point 32 rises to the turn-on point, diode D1 becomes forward biased and transistor T1 turns on. The transistor then draws collector current through its load resistors R6 and R7. The collector current through resistor R6 causes a voltage drop across this resistor which is communicated to the base of transistor T2 to turn on the novel bistable latching circuit 16 of this invention.

As the operation of the detector circuit 12 drives the base of transistor T2 negative, this transistor turns on and draws current from the positive bus through a diode D4. The collector current flows through the pair of load resistors R9 and R10 to the negative bus. This has the effect of energizing the base of a second stage T3 which also turns on, drawing collector current from the positive bus through its load resistors R12 and R13. The emitter current of transistor T3 flows through a diode D5 to the negative bus. To latch the circuit 16 in this conducting condition the negative-going collector voltage of the second stage T3 is fed back through resistor R11 and a low pass filter network 16a to the base of the first stage T2 to sustain conduction of T2 and thus latch the two stages in their conducting condition. Unlike previous transistor latching circuits, however, in this instance the resistors R11 and R8 which carry the feedback to the base of transistor T2 are so chosen in relation to transistor T2 that the feedback path causes the emitter-base current of T2 to rise very suddenly to avalanche proportions. At this point transistor T2 is then operating in the avalanche mode, rather than merely the normal saturated mode of a switching transistor. As a result, conduction of T2 and hence of T3 also is sustained even after the initial switching impulse from the detector circuit 12 is terminated. In fact, the only way to turn off the avalanche latching circuit 16 of this invention once it has been triggered is to open the switch S1 to turn off the power. The advantages of this avalanche circuit 16 are that it gives a very fast rise time, thus making for still greater timing accuracy, and once it is triggered it is very firmly latched into the conduction condition so that the device actuated by the timer circuit will continue to operate with great reliability until deliberately shut off by opening the switch S1. In addition, the circuit 16 provides two stages of amplification which cooperate with the amplification provided by the detector stage T1 and the output stage T4 to provide a high output current for operating the relay K1.

The latching circuit of this invention also includes several features which help to prevent accidental triggering thereof. First of all, silicon diodes D4 and D5 are placed in series with the emitters of the first and second stages T2 and T3 respectively of the latching circuit 16. The threshold potential of these diodes must be overcome before the transistors T2 and T3 can begin to conduct. Therefore the diodes provide a voltage cushion which helps prevent too easy firing of the latching transistors.

Another feature resides in the fact that the detector stage T1 amplifies as well as detects the signal developed by the bridge circuit 10. Consequently, the triggering level of the latching circuit 16 can be selected so that the latching circuit is easily fired by the amplified collector signal of the detector stage T1, but is not so easily triggered by lower voltage noise injected into the base circuit of transistor T2 without such amplification.

Finally, the feedback path from the collector of the second stage T3 through resistor R11 is connected through a low pass filter network 16a which includes a series of resistance R8 and a pair of shunt capacitors C2 and C3. This low pass filter network tends to prevent the first stage T2 from being triggered by high frequency noise spikes, yet passes the low frequency feedback signal from the second stage T3 to throw the first stage T2 into avalanche operation and thus latch the circuit 16.

When the second stage T3 of the latching circuit 16 conducts, the voltage drop across its collector load resistor R12 energizes the base of the final output amplifier stage T4. This stage then turns on and draws emitter current from the positive bus through a diode D6. The collector current of the final output amplifier stage T4 flows through a load resistor R14 and the output relay K1 to the negative bus. This relay K1 then operates a switch to control any desired equipment which is desired to be operated at the conclusion of the timing interval measured by the bridge circuit 10. The diode D6 is another of the silicon type, the threshold potential of which helps to prevent accidental triggering of the final output stage T4.

It will be appreciated from the foregoing discussion that one of the advantages of the timing circuit of FIG. 1 is that it includes four separate stages of amplification to drive the output relay K1. As previously mentioned, the transistor T1 of the detector circuit 12 amplifies as well as detects, and in addition the stages T2 and T3 of the latch circuit 16 also perform an amplifying as well as latching function. The final output stage T4 of circuit 18 provides still another stage of amplification to drive the relay K1.

In addition to operating a switch (not shown) to perform a control function at the end of the timing interval, the relay K1 closes another switch SK1 and thus operates the capacitor discharging circuit 20. Switch SK1 is normally open so as not to interfere with the charging of the timing capacitor C1 during the measuring of the time interval. At the end of this interval, however, when the relay K1 is operated to produce the ultimate output of the timing circuit, switch SK1 is closed to complete a discharge path for the capacitor C1 through a discharge resistor R5 and through the switch SK1 to the negative bus. This rapidly lowers the potential at point 32 to zero, thus restoring the bridge circuit 10 to its initial condition for the start of the next timing cycle.

It will now be appreciated that the timing circuit of FIG. 1 has a great many advantages, in that it provides an extremely accurate timing circuit which is compensated for both supply voltage variations and ambient temperature variations, which is protected against accidental triggering by high frequency noise spikes or by transistor leakage currents, but which latches firmly and reliably in a conducting condition at the close of the timing interval and cannot be unintentionally dislodged from that condition. Still another advantage which has been mentioned is the fact that there are several stages of amplification (some of these stages also performing other functions) to drive the output relay K1. Another feature of the circuit which is implict in the foregoing discussion is the fact that the detecting and latching functions are divided between the circuits 12 and 16 respectively. This enables the detecting function to be performed with great sensitivity by transistor T1, which is arranged so as to have virtually no threshold of operation.

As a result, the latching circuit 16 can now be provided with a safety threshold (by means of diodes D4 and D5) to prevent accidental triggering. The amplification of the stage T1 can be relied on to overcome this threshold when it is desired to fire the latching circuit 16, yet protection against accidental firing is achieved. The low pass filter network 16a also gives additional protection against accidental firing of the latching circuit 16. Thus, this circuit combines the extreme accuracy of circuit 12 which is triggered at exactly the right moment, with the reliability of the latching circuit 16 which is triggered only when its threshold is exceeded by the amplified output of the detector.

In view of the fact that the timing accuracy of a circuit of this type is critically dependent upon selection of the proper resistance and capacitance values, as well as the proper selection of semiconductor devices from the standpoint of their junction potential characteristics and their avalanche operating mode characteristics, the following table of components is included to show a particular illustrative embodiment of the circuit:

| | |
|---|---|
| T1 | 2N706 |
| T2 | 2N1303 |
| T3 | 2N1302 |
| T4 | 2N1303 |
| D1, D2, D3, D4, D5 | 1N461 |
| D6 | XY20 |
| C1 (Tantalex) | 47 µf–20 v. |
| C2 | .01 µf–25 v. |
| C3 | .1 µf–20 v. |
| Da | 1N191 |
| D2', D3' | TS2 |
| R4' | 10K—0.5 w. |
| P2' | 5K—0.5 w. |
| P1 | meg__ 1.5—0.5 w. |
| P2 | ohms__ 500—0.5 w. |
| R1, R2 | do____ 220—0.5 w. |
| R3 | do____ 240—0.5 w. |
| R4 | 1K—0.5 w. |
| R5 | ohms__ 27—0.5 w. |
| R6 | 6.8K—0.5 w. |
| R7 | 2.2K—0.5 w. |
| R8 | 22K—0.5 w. |
| R9 | 2.2K—0.5 w. |
| R10 | 1.5K—0.5 w. |
| R11 | 12K—0.5 w. |
| R12 | 1.5K—0.5 w. |
| R13 | 1K—0.5 w. |
| R14 | ohms__ 68—1 w. |
| Ra | 5.6K—0.5 w. |
| Rb | 20K—0.5 w. |
| RT1 | 35D6 thermistor |

FIG. 2 illustrates a timer circuit based upon the principles of FIG. 1, but designed for operation as an on-off cycle timer. The correspondence between the circuits of FIGS. 1 and 2 is made apparent by employing reference numerals for each of the circuits and components of FIG. 2 the last two digits of which match the reference numerals of their respective corresponding circuits and components in FIG. 1.

In the operation of this on-off timer, the output relay K101 is normally energized as long as the on-off switch S101 is closed. Under these conditions, a bridge circuit comprising sides 110a and 110b cooperates with a detector circuit 112, a latch circuit 116, and an output circuit 118 to accomplish de-energization of the output relay K101. Following this, a bridge circuit comprising the same side 110a and another side 210b cooperates with a detector circuit 212 and an output circuit 216 to re-energize the output relay K101. When this is accomplished, the cycle is repeated indefinitely. Thus, in general, circuits and components with reference numerals in the two hundred range function to turn the relay K101 on, while circuits and components with reference numerals in the one hundred range function to turn the relay K101 off. An exception to this is side 110a of the bridge circuit which functions during both the on cycle and the off cycle. The same is true of the compensating network 114 and the capacitor discharging circuit 120.

As soon as the on-off switch S101 is closed, the output relay K101 is energized, current flowing from the positive bus through the relay K101 and the limiting resistor R114 to the negative bus. Energization of the relay operates a switch (not shown) which typically turns on some equipment which it is desired to control. This equipment will then stay on for a pre-determined length of time measured by the circuit of FIG. 2.

Energization of the output relay K101 also operates the capacitor discharging switch SK101 of circuit 120, and moves it to the left as illustrated in FIG. 2. This discharges capacitor C201 and thus disables the entire capacitive charging circuit 210b. However, it leaves capacitor C101 of the capacitive charging circuit 110b free to charge up.

Therefore, current flows from the positive bus through potentiometer P101 and resistor R125 to charge the capacitor C101. In other words, the side 110b of the bridge circuit which is devoted to turning off the output relay K101, is brought into operation and begins to charge. The side 110a of the bridge circuit includes a resistive voltage divider R101 and R102 which establishes a reference voltage (for example one-half the supply voltage) at circuit point 130. Eventually, the charging of capacitor C101 results in an equal voltage being attained at circuit point 132. This condition of zero voltage across circuit points 130 and 132 is detected by circuit 112. The latter comprises transistor stage T101 and its associated collector resistors R106 and R107. Also included is a decoupling diode D101. The emitter of the detecting transistor T101 is returned through a compensating network 114 to the reference voltage established at circuit point 130. By way of variation, the circuit of FIG. 2 is designed for only two percent timing accuracy over a range of voltage and temperature variations; hence the compensating diodes D102 and D103 are used alone without the adjustment feature which is provided by resistor R3 and potentiometer P2 of FIG. 1.

After a time interval which is determined by the setting of predetermined P101, the timing capacitor C101 charges to make the voltage at point 132 equal to the reference voltage at point 130. This condition is detected by transistor T101 of the detecting circuit 112, and T101 then turns on. The resulting collector current causes a drop across load resistor R106 which energizes the base of transistor T102, the first stage of the latching circuit 116. T102 then turns on, drawing emitter current from the positive bus through its emitter threshold diode D104. Collector current of transistor T102 flows through its load resistors R109 and R110 to the negative bus. The turning on of the first stage T102 energizes the base of the second stage transistor T103, turning this stage on also. T103 then draws collector current from the positive bus through its load resistors R112 and R113. Emitter current of transistor T103 flows through its silicon threshold diode D105 to the negative bus.

A feedback path is provided from the collector of the second stage T103 through resistor R111 and the low pass filter network 116a to the base of the first stage T102 to latch the circuit 116 in its conducting condition. Once again, the latching is achieved by driving the first stage T102 into operation in the avalanche mode. The low pass filter 116a, comprising the series resistor R108 and the shunt capacitors C102 and C103, serves to prevent accidental triggering of the latch circuit 116 by high frequency noise spikes.

At this point it will be appreciated that as the timer circuit of FIG. 2 goes through its timing cycle to shut off the output relay K101, the operation of the bridge circuit including sides 110a and 110b is quite similar to the operation of the bridge circuit 10 of FIG. 1. The only difference is that the presence of the additional resistor R125 in side 110b of the bridge circuit in FIG. 2 somewhat limits the range of variation of the length of the timed interval which may be achieved by adjusting potentiometer P101. Similarly, the detector circuit 112 operates in a manner very similar to the detector 12 of FIG. 1. The compensating circuit 114 is similar to the compensating circuit 14 of FIG. 1, except for the absence of resistor R3 and potentiometer P2 which makes the circuit of FIG. 2 somewhat cheaper and less accurate. The bistable latching circuit 116 and its associated low pass filter feedback network 116a correspond exactly to the latching circuit 16 and low pass filter feedback network 16a of FIG. 1.

When the latch circuit 116 turns on, the T103 collector current causes a voltage drop across load resistor R112 which energizes the base of transistor T104 of the output circuit 118. Transistor T104 then turns on and draws emitter current from the positive bus through the aforementioned silicon threshold diode D104. Collector current of the transistor T104 flows through the aforesaid load resistor R114 to the negative bus.

When transistor T104 is thus conducting, the output relay K101 is short circuited by the low impedance of the now forward biased diode 104 and the now conducting transistor T104. In other words, most of the current flowing from the positive bus through the load resistor R114 is shunted through diode D104 and transistor T104. This allows the output relay K101 to turn off at the end of the time interval measured by the side 110b of the bridge circuit. When the output relay K101 is thus turned off, it opens the aforesaid switch (not shown) to shut off the equipment controlled by the timing circuit.

Relay K101 will now remain shut off as long as the latch circuit 116 remains in its conducting condition, to energize the transistor T104 and thus short circuit the relay.

As relay K101 is shut off it releases the relay-operated switch SK101, which then returns under spring bias to its right hand terminal to discharge the timing capacitor C101 which has just finished measuring the timing interval for turning the relay off. Relay shut-off capacitor C101 then returns to its initial condition to await the next relay shut-off timing cycle. However, it does not have any effect on the condition of relay K101. The latter remains shut-off because the latch circuit 116 is still conducting and the transistor T104 still short circuits the relay.

However, with the removal of switch SK101 from its left hand terminal, a chain of events is set in motion which does result in the turning on of relay K101 once again at the end of another measured time interval. The removal of switch SK101 from its left hand terminal now permits a second timing capacitor C201 to begin charging. In other words, the bridge circuit now in effect comprises side 110a and side 210b. After a time interval determined by the setting of potentiometer P201, the capacitor C201 charges until the voltage at point 232 equals the voltage at reference point 130. The end of this timing interval, as evidenced by the equality of these voltages, is detected by circuit 212, which comprises transistor T201, its associated collector load resistors R206 and R207, and its associated decoupling diode D201. The emitter of transistor T201 is returned through the same compensating network 114 to the reference voltage at circuit point 130. The aforementioned bypass resistor R104 allows the emitter current of T201 to return to the negative bus when the transistor is conducting.

It will be appreciated that side 210b of the bridge circuit is similar in all respects to side 110b. Similarly, the detector 212 is exactly the same as the detector circuit 112. Furthermore, the compensating network 114 operates in exactly the same manner in conjunction with detector 212 as it does with detector 112.

After the voltages at points 130 and 232 reach equality, the detector transistor T201 turns on. The resulting collector current causes a voltage drop across load resistor R206 which energizes the base of transistor T202 of an output circuit 216. The transistor T202 then turns on and draws emitter current from the aforementioned silicon threshold diode D104. Collector current of the transistor T202 returns through the feedback resistor R111 and the second stage T103 and diode D105 of the latch circuit 116. As a result, the turning on of transistor T202 substantially short circuits the feedback network of the bistable latching circuit 116. Stated differently, the avalanche latching current which would otherwise flow from diode D104 through the emitter-base path of T102 and then through the resistor R108 to resistor R111 is now diverted to flow from diode D104 through the emitter-collector path of transistor T202 to the resistor R111. As a result, the second stage T103 of the latch circuit 116 now derives from the collector of transistor T202 most of the current which it formerly drew from the base of the first stage T102. Thus the first stage T102 of the latch circuit 116 is now deprived of sufficient base current to hold it in the conductive condition, and it is therefore allowed to turn off. As a consequence, the second stage T103 also turns off. This in turn allows transistor T104 of the output circuit 118 to turn off also. Now the output relay K101 is no longer short circuited by transistor T104, and the relay therefore turns on again at the end of the period of time measured by capacitor C201.

Throughout this entire relay turn-on timing interval, the relay-operated switch SK101 has been held at its right hand terminal. This serves to keep the capacitor C101 quiescent, and therefore prevent reactivation of circuits 112, 116, and 118 so that these circuits do not turn the relay K101 off again until the proper time.

Now, however, the relay K101 has been successfully turned back on. This once again closes the switch (not shown) which controls the desired equipment. It also transfers the relay-operated switch SK101 of discharge circuit 120 back to its left hand terminal. This permits capacitor C101 to begin charging again, thus initiating the next timing cycle leading to the next shut-off of relay K101. It also discharges the relay-turn-on capacitor C201, which allows transistors T201 and T202 to turn off once they have dislodged the latching circuit 116. Furthermore, during the relay-shut-off cycle which follows, switch SK101 keeps the capacitor C201 discharged so as not to actuate the relay-turn-on circuits 212 and 216 until the proper time.

It will now be appreciated that as long as the on-off switch S101 remains closed, the output relay K101 will be cycled on and off indefinitely. The length of time during which the relay remains on is determined by potentiometer P201, while the length of time during which the relay remains off is determined by potentiometer P101, and these two time intervals may be individually adjusted to unequal durations if so desired.

It will now be appreciated from all of the foregoing discussion that this on-off cycle timer has the same advantages (except for a difference of degree) of accuracy and voltage and temperature compensation described in connection with the timer circuit of FIG. 1. In addition, the detector circuits 112 and 212 function with the sensitivity of the detector 12 of FIG. 1, while the latch circuit 116 has the reliable threshold operation of the circuit 16 of FIG. 1. This is due to the silicon threshold diodes D104 and D105, and to the amplifying properties of the detector stage T101. Note further that in this circuit the diode D104 is made to serve the same purpose in connection with three different transistors T202, T102, and T104. Once again, there is a low pass filter network 116a which prevents accidental triggering of the latch circuit 116 by high frequency noise spikes. Another feature of the circuit of FIG. 1 which is incorporated here is the use of diodes D101 and D201 to decouple the detectors from the bridge circuit at points 132 and 232 respectively.

In addition to all this, it will be realized that the compensating network 114 serves both the relay-turn-on detector circuit 212 and the relay-turn-off detector circuit 112. As a result, there is common voltage and temperature compensation for both the relay-turn-on and relay-turn-off operating cycles of this timer, so that the two operating cycles stay well in track with each other over a range of voltage and temperature variation.

A further special feature of FIG. 2 is the fact that the capacitor discharging circuit 120 serves first one and then the other of the timing capacitors C201 and C101, and also functions to keep each of the timing capacitors discharged during the entire charging interval of the other timing capacitor so as to prevent interference between the relay-turn-on and the relay-turn-off circuitry of FIG. 2.

The following table of components is included to show a particular illustrative embodiment of the foregoing on-off cycle timer:

| | |
|---|---|
| T201 | 2N706 |
| T101 | 2N706 |
| T102 | 2N1303 |
| T202 | 2N1303 |
| T103 | 2N1302 |
| T104 | 2N1303 |
| D102 | DL150 |
| D103 | DL150 |
| D101 | 1N461 |
| D201 | 1N461 |
| D104 | XY20 |
| D105 | XY20 |
| C201 | 47 µf–20 v. |
| C101 | 47 µf–20 v. |
| C102 | .01 µf–20 v. |
| C103 | .1 µf–20 v. |
| P201 | meg 1.5—0.5 w. |
| P101 | do 1.5—0.5 w. |
| R101 | ohms 220—0.5 w. |
| R102 | do 220—0.5 w. |
| R104 | 1.5K—0.5 w. |
| R225 | 4.7K—0.5 w. |
| R105 | ohms 27—0.5 w. |
| R125 | 4.7K—0.5 w. |
| R207 | 2.2K—0.5 w. |
| R107 | 2.2K—0.5 w. |
| R106 | 6.8K—0.5 w. |
| R108 | 22K—0.5 w. |
| R109 | 2.2K—0.5 w. |
| R110 | 1.5K—0.5 w. |
| R111 | 12K—0.5 w. |
| R206 | 6.8K—0.5 w. |
| R113 | 1K—0.5 w. |
| R112 | 1.5K—0.5 w. |
| R114 | ohms 120—0.5 w. |
| $Ra'$ | 5.6K—0.5 w. |
| $Rb'$ | 20K—0.5 w. |
| RT101 | 35D6 thermistor |

What has been described is a preferred embodiment and is presently believed to be the best mode of practicing the invention, but it will be clear to those skilled in this art that many modifications may be made without departing from the principles of the invention. Accordingly this description is intended merely as an illustrative example, the broader scope of the invention being stated in the appended claims.

I claim:
1. An electronic timing circuit comprising:
means for providing a source voltage;
a bridge circuit including means connected to said source means to provide a reference voltage which is a predetermined fraction of said source voltage and a capacitive charging circuit connected to said source means to charge within a predetermined time to a predetermined fraction of said source voltage;
an electronic sensing device having control electrodes connected to said reference voltage and said capacitive charging voltage respectively and arranged to be normally cut off but to be conductive after the value of said capacitive charging voltage crosses the value of said reference voltage;
said control electrodes having a threshold voltage for operating said sensing device;
and means for cancelling said threshold voltage including a variable resistance and a component having an inherent voltage thereacross connected in series opposing relationship with said threshold voltage of said sensing device, and a resistance connected across said component and said variable resistance.

2. An electronic timing circuit comprising:
means for providing a source voltage;
a bridge circuit including means connected to said source means to provide a reference voltage which is a predetermined fraction of said source voltage and a capacitive charging circuit connected to said source means to charge within a predetermined time to a predetermined fraction of said source voltage;
an electronic sensing device having control electrodes connected to said reference voltage and said capacitive charging voltage respectively and arranged to be normally cut off but to be conductive after the value of said capacitive charging voltage crosses the value of said reference voltage;
said control electrodes having a threshold voltage for operating said sensing device;
a semiconductor diode having a threshold voltage connected in series with one of said control electrodes and poled so as to decouple said control electrode from said bridge circuit before said voltage crossing occurs;
and means for cancelling both of said threshold voltages including a variable resistance and a pair of cancelling diodes each having an inherent voltage thereacross connected in series opposing relationship with said threshold voltages of said sensing device and decoupling diode, and a resistance connected across said variable resistance and at least one of said cancelling diodes.

3. An electronic timing circuit comprising:
means for providing a source voltage;
a bridge circuit including means connected to said source means to provide a reference voltage which is a predetermined fraction of said source voltage and a capacitive charging circuit connected to said source means to charge within a predetermined time to a predetermined fraction of said source voltage;
an output circuit including an electronic sensing device connected across said reference voltage, a latching means turning on in response to said electronic sensing device, and a relay connected to be operated by said latching means when the latter is turned on;

and a switch operated by said relay and arranged to discharge said capacitive charging circuit when and only when said relay is so operated;

said electronic sensing device turning off upon discharge of said capacitive charging circuit;

said latching means remaining on after turning off of said electronic sensing device to keep said relay operated;

said latching means comprising:
 first and second transistor switching stages;
 means for applying a signal to initially turn on said first stage;
 said second stage being connected to be driven on when said first stage is on;
 a path connected from the output of said second stage to the input of said first stage for the output of said second stage to cause the flow of additional emitter-base current in said first stage;
 said circuit being arranged so that said additional emitter-base current drives said first stage into self-sustaining operation.

4. An electronic timing circuit as in claim 3, wherein said path comprises low pass filter means.

5. An electronic on-off cycle timer circuit comprising:
first and second time base circuits;
first and second electronic sensing devices connected to said first and second time base circuits respectively, and each arranged to be normally cut off but to be conductive after the timing interval measured by its associated time base circuit;
means connected across said source means to be normally energized;
means responding to conduction of said first sensing device to assume a stable condition effective to short-circuit said normally energized means whereby to provide an "off" interval;
means responding to conduction of said second sensing device to dislodge the aforesaid means from said stable condition to permit re-energization of said normally energized means whereby to provide an "on" interval;
and means for alternately operating said time base circuits.

6. An electronic on-off cycle timer circuit comprising:
means for providing a source voltage;
a bridge circuit including means connected to said source means to provide a reference voltage which is a predetermined fraction of said source voltage;
said bridge circuit further including first and second capacitive charging circuits each connected to said source means to charge within predetermined times to predetermined fractions of said source voltage;
first and second electronic sensing devices connected across said reference voltage and said first and second capacitive charging voltages respectively, and each arranged to be normally cut off but to be conductive after the value of its associated capacitive charging voltage crosses the value of said reference voltage;
means connected to be normally energized;
means responding to conduction of said first sensing device to assume a stable condition effective to de-energize said normally energized means whereby to provide an "off" interval;
means responding to conduction of said second sensing device to dislodge the aforesaid means from said stable condition to permit re-energization of said normally energized means whereby to provide an "on" interval;
and means responding to said "on" interval to discharge said second capacitive charging circuit and allow said first capacitive circuit to charge, and responding to said "off" interval to discharge said first capacitive charging circuit and allow said second capacitive circuit to charge.

7. An electronic on-off cycle timer circuit comprising:
means for providing a source voltage;
a bridge circuit including means connected to said source means to provide a reference voltage which is a predetermined fraction of said source voltage;
said bridge circuit further including first and second capacitive charging circuits each connected to said source means to charge within predetermined times to predetermined fractions of said source voltage;
first and second electronic sensing devices connected across said reference voltage and said first and second capacitive charging voltages respectively, and each arranged to be normally cut off but to be conductive after the value of its associated capacitive charging voltage crosses the value of said reference voltage;
a relay connected across said source means to be normally energized;
means responding to conduction of said first sensing device to assume a stable condition effective to short-circuit said relay whereby to provide an "off" interval;
means responding to conduction of said second sensing device to dislodge the aforesaid means from said stable condition to permit re-energization of said relay whereby to provide an "on" interval;
and a double-throw switch operated by said relay and arranged so that when said relay is energized said double-throw switch discharges said second capacitive charging circuit and allows said first capacitive circuit to charge, and when said relay is de-energized said double-throw switch discharges said first capacitive charging circuit and allows said second capacitive circuit to charge.

8. An electronic on-off cycle timer circuit comprising:
means for providing a source voltage;
a bridge circuit including means connected to said source means to provide a reference voltage which is a predetermined fraction of said source voltage;
said bridge circuit further including first and second capacitive charging circuits each connected to said source means to charge within predetermined times to predetermined fractions of said source voltage;
first and second electronic sensing devices having respective pairs of control electrodes connected across said reference voltage and said first and second capacitive charging voltages respectively, and each arranged to be normally cut off but to be conductive after the value of its associated capacitive charging voltage crosses the value of said reference voltage;
each of said pairs of control electrodes having a threshold voltage for operating its associated sensing device;
and common means for cancelling said threshold voltages of both sensing devices.

9. An electronic on-off cycle timer circuit comprising:
first and second time base circuits;
first and second electronic sensing devices connected to said first and second time base circuits respectively, and each arranged to be normally cut off but to be conductive after the timing interval measured by its associated time base circuit;
means connected across said source means to be normally energized;
a latching circuit including first and second transistor stages;
said first stage being connected to respond to conduction of said first sensing device;
said second stage being connected to be driven on when said first stage is on;
a path connected from the output of said second stage to the input of said first stage for the output of said second stage to cause the flow of additional emitter-base current in said first stage;

said circuit being arranged so that said additional emitter-base current drives said first stage into self-sustaining avalanche operation;

said second stage when on being effective to de-energize said normally energized means whereby to provide an "off" interval;

a further electronic switch connected to shunt said path and turning on in response to conduction of said second sensing device whereby to interrupt said self-sustaining avalanche operation to turn off said latching circuit in order to permit re-energization of said normally energized means and thus provide an "on" interval;

and means for alternately operating said time base circuits.

10. An electronic timing circuit comprising:

means for providing a source voltage;

a bridge circuit including means connected to said source means to provide a reference voltage which is a predetermined fraction of said source voltage and a capacitive charging circuit connected to said source means to charge within a predetermined time to a predetermined fraction of said source voltage;

an electronic sensing device having control electrodes connected to said reference voltage and said capacitive charging voltage respectively and arranged to be normally cut off but to be conductive after the value of said capacitive charging voltage crosses the value of said reference voltage;

said control electrodes having a threshold voltage for operating said sensing device;

a semiconductor diode having a threshold voltage connected in series with one of said control electrodes and poled so as to decouple said control electrode from said bridge circuit before said voltage crossing occurs;

and means for cancelling both of said threshold voltages including a pair of cancelling diodes each having an inherent voltage thereacross, a potentiometer across at least one of said diodes at its ends, the tap of said potentiometer being connected to the other one of said control electrodes, and said diodes being connected in such manner that at least part of said inherent voltage thereof is in series opposing relationship with said threshold voltages of said sensing device and said decoupling diode.

11. A voltage crossing detector circuit, comprising:

a reference source providing a reference voltage with respect to a point of reference potential;

a signal source providing a signal voltage having a value which increases from a value lower than to a value greater than said reference voltage;

a transistor having base, emitter, and collector electrodes;

a collecting impedance connected between said collector electrode and a power supply;

a semiconductor decoupling diode connecting said signal source to the base electrode of said transistor with the same polarity as the base-emitter junction thereof;

a resistor connected between said emitter electrode and said point of reference potential; and means connecting a pair of forward-biased semiconductor cancelling diodes between said reference source and said emitter electrode.

12. A voltage crossing detector circuit, comprising:

a reference source providing a reference voltage with respect to a point of reference potential;

a signal source providing a signal voltage having a value which increases from a value lower than to a value greater than said reference voltage;

a transistor having base, emitter and collector electrodes;

a first semiconductor diode connecting said signal source to said base electrode, said first semiconductor diode being poled in the same direction as the base-emitter junction of said transistor;

a collector impedance connected between said collector electrode and a power supply;

means connecting in series in the order named a second semiconductor diode, a third semiconductor diode and a first resistor between said reference source and said point of reference potential, said second and third diodes being forwardly-biased;

a second resistor connecting in parallel with third diode;

and means connecting said emitter electrode to an intermediate point of second resistor.

13. A voltage crossing detector circuit, comprising:

a power supply reference terminal and a power supply further terminal;

a voltage divider connected between said further terminal and said reference terminal and having an intermediate tap thereon;

a timing circuit including a first resistor and a capacitor connected in series between said further terminal and said reference terminal;

a transistor having emitter, base and collector electrodes;

means connecting said base electrode to the junction between said first resistor and said capacitor;

a load impedance connecting said collector electrode with said further terminal;

a series circuit including in the order named a first forwardly-biased semiconductor diode and a second resistor connected between said intermediate tap and said reference terminal;

a potentiometer connected in parallel with said first diode and having a potentiometer tap; and means connecting said emitter electrode to said potentiometer tap.

14. The crossover detector defined in claim 13, wherein said first named means includes a semiconductor diode poled in the same direction as the base-emitter diode of said transistor.

15. The crossover detector defined in claim 13, wherein said series circuit includes at least one further forwardly-biased semiconductor dioded connected between said intermediate tap and said first forwardly-biased diode.

16. A latching circuit comprising:

first and second transistor switching stages;

means for applying a signal to initially turn on said first stage;

said second stage being connected to be driven on when said first stage is on;

a path including a low pass filter connected from the output of said second stage to the input of said first stage for the output of said second stage to cause the flow of additional emitter-base current in said first stage;

said circuit being arranged so that said additional emitter-base current drives said first stage into self-sustaining operation; and an electronic switch connected to shunt said path to interrupt said self-sustaining operation when said electronic switch is turned on.

17. A voltage crossing detector circuit, comprising:

a reference source providing a reference voltage with respect to a point of reference potential;

a signal source providing a signal voltage having a value which increases from a value lower than to a value greater than said reference voltage;

a transistor having base, emitter, and collector electrodes;

a collector impedance connected between said collector electrode and a power supply;

a semiconductor decoupling diode connecting said signal source to the base electrode of said transistor with the same polarity as the base-emitter junction thereof, said diode and said base-emitter junction having inherent threshold voltages;

a resistor connected between said emitter electrode and said point of reference potential; and cancelling means connected between said reference source and said emitter electrode, said cancelling means producing a compensating voltage drop of the same polarity as and slightly greater than the sum of threshold voltages of said diode and said base-emitter junction, whereby said transistor conducts just before said signal voltage equals said reference voltage.

18. The voltage crossing detector circuit defined in claim 17, wherein said cancelling means includes at least one forward-biased semiconductor diode.

References Cited
UNITED STATES PATENTS

| | | |
|---|---|---|
| 2,906,926 | 9/1959 | Bauer. |
| 3,082,329 | 3/1963 | Meyer et al. |
| 3,165,648 | 1/1965 | Sainsbury. |
| 3,172,018 | 3/1965 | Franklin _____ 317—148.5 |
| 3,182,227 | 5/1965 | Brittain et al. _____ 307—132 X |
| 3,205,411 | 9/1965 | Culbertson _____ 317—142 |

MILTON O. HIRSHFIELD, *Primary Examiner.*

L. T. HIX, *Assistant Examiner.*

UNITED STATES PATENT OFFICE
CERTIFICATE OF CORRECTION

Patent No. 3,355,632

November 28, 1967

Klaus Wallentowitz

It is certified that error appears in the above identified patent and that said Letters Patent are hereby corrected as shown below:

Column 1, line 23, "an an" should read -- to an --. Column 3, line 15, "P2" should read -- R2 --. Column 8, line 66, "predetermined" should read -- potentiometer --.

Signed and sealed this 12th day of August 1969.

(SEAL)
Attest:

Edward M. Fletcher, Jr.
Attesting Officer

WILLIAM E. SCHUYLER, JR.
Commissioner of Patents